UNITED STATES PATENT OFFICE.

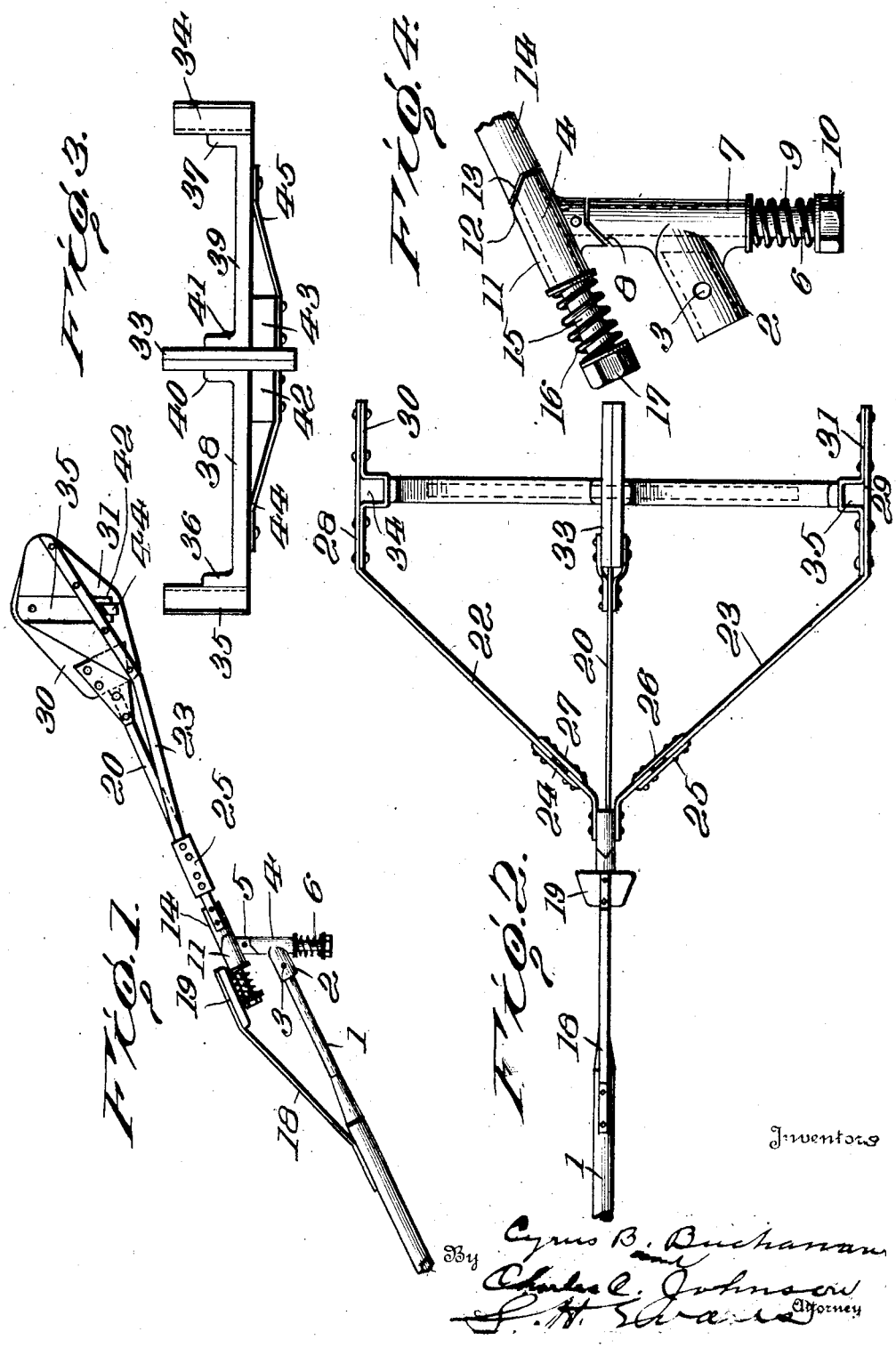

CYRUS B. BUCHANAN AND CHAS C. JOHNSON, OF RICHMOND, VIRGINIA.

CURRENT COLLECTOR.

1,403,891. Specification of Letters Patent. Patented Jan. 17, 1922.

Application filed August 1, 1921. Serial No. 488,985.

*To all whom it may concern:*

Be it known that we, CYRUS B. BUCHANAN and CHAS C. JOHNSON, citizens of the United States, residing at Richmond, in the county of Henrico and State of Virginia, have invented certain new and useful Improvements in Current Collectors, of which the following is a specification.

Our invention relates to improvements in current collectors.

The object of our invention is to provide a current collector for conveying electric current from trolley wires to motor driven vehicles whereby current is supplied for propelling the same and pertains more particularly for use to permit a vehicle, not running on tracks to operate, and whereby the current is at all times collected from the wires no matter how far the vehicle or motor is from the trolley wires, it being understood, by those skilled in the art, that in operating a vehicle, the radius of operation is limited by the vertical supports on the sides of the street or roadway.

Another object of our invention is to provide a collector of this character in which a positive contact is obtained from both the positive and negative wires, regardless of their relative arrangement in respect to a horizontal line when the vehicle is in any position with respect to the trolley wires.

Another object of our invention is to provide a current collector having a greater latitude of usage and at the same time provide a simple cheap and effective device having certain details of structure and combination of parts hereinafter more fully set forth.

In the accompanying drawings,

Figure 1, is a side elevation of our improved current collector attached to the ordinary pole carried by the top of the trolley car.

Figure 2, is a top plan view of Figure 1.

Figure 3, is a transverse vertical sectional view taken on the line 3—3 Figure 1 and showing one trolley wire slightly higher than the other.

Figure 4, is an enlarged side elevation showing the double pivotal connection for allowing the universal movement of the collector head.

While our current collector could be used on what are known as trolley cars, yet it is more particularly designed for motor propelled vehicles not running on tracks and is particularly designed to allow the vehicle to move a greater distance from the trolley wires, whereby the same can pass another vehicle, receiving its power from the same wires or can turn completely around, and where a vehicle or other obstruction would ordinarily block or tie up traffic, our improved current collector, permits a trackless vehicle to pass on either side of the obstruction, and at the same time causing the collector to have a perfect contact with the positive and negative wires.

Referring now to the drawings 1 represents the trolley pole which is preferably of the form used on ordinary trolley cars, and which has its upper end tightly fitting in the socket 2 in the trolley head proper by means of a pin 3 or like means and whereby it is removably supported yet held against rotation on the trolley pole. The head proper consists of the approximately T shaped casting 4 of tubular metal, the vertical portion 4 has its lower edge provided with the cam or V shaped face 5 and rigidly secured in said portion 4 is a rod 6 which extends downwardly and passes through the elongated tubular portion 7 carrying the socket 2. The upper end of the tubular portion 7 has a cam face 8 corresponding with the cam face 5 and normally held in the position shown in Figure 4 by means of the coil spring 9. This spring surrounds the rod 6 and is held under tension by the nut 10 screwed on the end of the rod and locked thereon by a cotter pin or like means. The spring forces the nut down carrying the rod and drawing the T shaped casting down so that the cam faces interlock and the head is held against oscillation under ordinary pressure.

The horizontal portion 11 of the casting 4 has its upper edge cam shaped at 12 and adapted to coact with the cam shaped end 13 of the member 14. The member 14 is provided with a rigid rod 15 which extends through the member 11 and is surrounded by the coil spring 16 and has a nut 17 compressing the spring and normally holding the cam faces 12 and 13 together as shown in Figure 4 of the drawings.

In order to prevent the cross wires supporting the trolley wires from catching under the rod 15 and member 11 we provide a guard which consists of the leaf spring 18 rigidly connected to the trolley pole 1 and provided at its upper end with the large plate 19 whereby bolt and nut 17 are always covered thereby, regardless of the position of the head.

The member 14 has secured therein the rigid arm 20, and the two outwardly flared arms 22 and 23 which are broken as indicated at 24 and 25 and secured together by the insulating blocks 26 and 27 whereby the outer ends of the arms are insulated from the inner ends so that the current can not be conveyed to the trolley pole. The ends 28 and 29 of the arms 22 and 23 are bent parallel to each other as clearly shown in Figure 2 of the drawings. Secured to the ends 28 and 29 are the enlarged plates 30 and 31 which are disposed substantially vertically and form guards to prevent the head from leaving the trolley wires as will be hereinafter more fully described.

The member 14 has rigidly secured thereto the outwardly extending arm 20 to which is rigidly secured the insulating blocks 33. The plates 30 and 31 intermediate their ends are provided with the inwardly pressed ribs 34 and 35. Secured to said ribs are the upwardly turned ends 36 and 37 of the collecting surfaces 38 and 39. The inner ends of 38 and 39 are turned upwardly as indicated at 40 and 41 and secured to the insulating blocks 33. In order to brace the said collecting surfaces, the blocks 42 and 43 are secured to the block 33 and a trust secured to said blocks 42 and 43 and having its free ends 44 and 45 secured to the members 38 and 39 as clearly shown in Figure 3 of the drawings.

From the foregoing description it will be seen that plates 36 and 37 are insulated from each other and also from the trolley pole 1 or the ground and one is adapted to engage the positive trolley wire and the other the negative wire. The plates are connected by wire secured thereto and arranged in any desired manner and extended down and connected to the motor of the vehicle.

The trolley pole 1 as understood is pivoted on the vehicle and when the vehicle moves in its travel to and from the trolley wire, the pole swings on its pivot until the trolley wires engage the upturned ends 36, 37, 40 and 41, when the trolley wire gives a twisting action on the member 11 which causes the came face thereof to ride up on the cam face registering therewith and permitting it to turn and allow it to assume a position approximately parallel with the trolley wires. The ribs formed in the plates 30 and 31 brings the upturned ends 36 and 37 some distance in beyond the body of the plates so that at all times in turning the vehicle, these ends will engage the trolley wires before they reach the center of the outer plates, thus permitting the receivers to turn to a greater angle and thereby securing a greater radius for operating the vehicle.

When the tension caused to swing the head on either its horizontal or vertical pivot is relieved the cam faces by reason of the springs causes the head to assume its normal position and it will be seen that this tension can be readily adjusted as desired.

Having thus described our invention, what we claim and desire to secure by Letters Patent, is:—

1. A trolley, comprising a pole, a head adapted to swing in a vertical and horizontal plane and two current collecting surfaces carried by the head.

2. A trolley comprising a pole, a head adapted to swing in a vertical or horizontal plane, and insulated positive and negative current collecting surfaces carried by the head.

3. A trolley comprising a pole, a head horizontally and vertically pivoted to the pole and adapted under spring tension to be maintained in a normal position, and insulated collecting surfaces carried by the head.

4. A trolley comprising a pole, a head adapted to swing in a horizontal and vertical plane and normally spring held, and two current collecting surfaces carried by the head.

5. A trolley comprising a pole, a head adapted to swing in horizontal and vertical planes and normally spring held, and positive and negative current collecting surfaces carried by the head, and insulated from each other.

6. A trolley comprising a pole, a head adapted to swing in a vertical and horizontal plane and normally spring held, three insulated arms carried by the head and current collecting surfaces between said arms.

7. A trolley comprising a pole, a head adapted to swing in a vertical and horizontal plane and normally spring held, three insulated arms carried by the head, plates carried by the outside arms and having inwardly pressed ribs, and two current collecting surfaces having upwardly turned inner ends engaging the center arms, and upwardly turned outer ends secured to the ribs.

8. A trolley comprising a pole, a head adapted to swing in a vertical and horizontal plane and normally spring held, three insulated arms carried by the head, two current collecting surfaces between the arms and insulated from each other, and a guard carried by the pole and extending over vertical and horizontal swinging connections.

9. A trolley comprising a pole, a head adapted to swing in a vertical and horizontal plane and normally spring held, and two current collecting surfaces carried by the head and insulated from the pole.

10. A trolley, comprising a pole, a head adapted to swing in a vertical and horizontal plane, collecting surfaces carried by the head, and cam faces adapted to cause the head to return to its normal position.

11. A trolley comprising a pole, a head adapted to swing in a vertical and horizontal plane, springs holding the head in its normal position, two collecting surfaces carried by the head and cam faces arranged to cause the head to return to and be retained in its normal position when the vertical and horizontal pressure is not sufficient to overcome the springs.

In testimony whereof we affix our signatures.

CYRUS B. BUCHANAN.
CHAS C. JOHNSON.